(12) United States Patent
Corson

(10) Patent No.: US 10,284,678 B2
(45) Date of Patent: May 7, 2019

(54) BANDWIDTH MANAGEMENT BASED ON PROFILES

(71) Applicant: SONY INTERACTIVE ENTERTAINMENT INC., Tokyo (JP)

(72) Inventor: Gregory Corson, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 534 days.

(21) Appl. No.: 14/206,245

(22) Filed: Mar. 12, 2014

(65) Prior Publication Data

US 2014/0280847 A1    Sep. 18, 2014

Related U.S. Application Data

(60) Provisional application No. 61/788,023, filed on Mar. 15, 2013.

(51) Int. Cl.
    *G06F 15/173*      (2006.01)
    *H04L 29/08*      (2006.01)

(52) U.S. Cl.
    CPC ............ *H04L 67/30* (2013.01); *H04L 67/322* (2013.01)

(58) Field of Classification Search
    CPC .............................. H04L 67/30; H04L 67/322
    See application file for complete search history.

(56) References Cited

U.S. PATENT DOCUMENTS

| | | | |
|---|---|---|---|
| 2006/0222015 A1* | 10/2006 | Kafka et al. | H04L 29/06027 370/477 |
| 2006/0242315 A1* | 10/2006 | Nichols | H04N 7/17318 709/231 |
| 2008/0013533 A1 | 1/2008 | Bogineni et al. | |
| 2008/0049615 A1* | 2/2008 | Bugenhagen | H04L 43/0817 370/230.1 |
| 2008/0084896 A1 | 4/2008 | Fleury et al. | |
| 2008/0126621 A1 | 5/2008 | Huang | |

(Continued)

FOREIGN PATENT DOCUMENTS

| | | |
|---|---|---|
| WO | WO 2014/140858 | 9/2014 |
| WO | WO 2014/150965 | 9/2014 |

OTHER PUBLICATIONS

PCT Application No. PCT/US2014/024656 International Search Report and Written Opinion dated Aug. 5, 2014.
PCT/IB2014/001019, Bandwidth Management Based on Profiles, filed Mar. 12, 2014.
U.S. Appl. No. 14/206,787, Gegory Corson, Profile Generation for Bandwidth Management, filed Mar. 12, 2014.

(Continued)

*Primary Examiner* — Suraj M Joshi
*Assistant Examiner* — Jaren Means
(74) *Attorney, Agent, or Firm* — Polsinelli LLP

(57) ABSTRACT

Bandwidth management based on profiles is provided. A requesting user using a user device may submit a request concerning access to an application or media file hosted or provided by a content provider. A profile associated with the requested application or media file may be accessed. Such a profile provides information regarding consumption of bandwidth throughout a time period of usage associated with the requested application or media file. Bandwidth requirements associated with the request may be determined based on the profile information, and bandwidth consumption by the user device may be managed based on the bandwidth requirements determined for the requested application or media file and available network bandwidth.

20 Claims, 3 Drawing Sheets

(56) References Cited

U.S. PATENT DOCUMENTS

| | | | |
|---|---|---|---|
| 2008/0255692 A1* | 10/2008 | Hofrichter | H04L 12/2805 |
| | | | 700/94 |
| 2009/0260045 A1* | 10/2009 | Karlsson | H04N 21/2187 |
| | | | 725/93 |
| 2011/0258336 A1* | 10/2011 | Salomons | G06F 17/30017 |
| | | | 709/231 |
| 2011/0314145 A1* | 12/2011 | Raleigh | H04L 41/0893 |
| | | | 709/224 |
| 2014/0141793 A1 | 5/2014 | Bello et al. | |
| 2014/0229579 A1 | 8/2014 | Johnson | |
| 2014/0280974 A1 | 9/2014 | Corson | |
| 2017/0207978 A1 | 7/2017 | Corson | |

OTHER PUBLICATIONS

PCT/US14/24656, Profile Generation for Bandwidth Management, filed Mar. 12, 2014.
PCT Application No. PCT/IB2014/001019 International Search Report and Written Opinion dated Oct. 28, 2014.
U.S. Appl. No. 14/206,787 Office Action dated Jul. 27, 2016.

* cited by examiner

BANDWIDTH MANAGEMENT BASED ON PROFILES

CROSS-REFERENCE TO RELATED APPLICATIONS

The present application claims priority benefit of U.S. provisional application 61/788,023 filed Mar. 15, 2013, the disclosure of which is incorporated herein by reference. The present application is related to U.S. patent application Ser. No. 14/206,787, now U.S. Pat. No. 9,614,732, titled "Profile Generation for Bandwidth Management," that was filed concurrently, the disclosure of which is incorporated herein by reference.

BACKGROUND OF THE INVENTION

1. Field of the Invention

The present invention generally relates to bandwidth management. More specifically, the present invention relates to bandwidth management based on profiles.

2. Description of the Related Art

There are a variety of presently available devices whose uses involve different bandwidth requirements in a network. Many of the devices may be used simultaneously in the same network. Users may also use multiple applications or stream media files that demand bandwidth at the same time. For example, one user may use a device to stream high-definition video, while another is playing a game. A problem may arise in some circumstances when multiple devices, applications, and media files are being used at the same time. Specifically, such competing bandwidth requirements may cause such issues as video freeze-ups (to allow for buffering) and stalls in online applications, such as games.

One presently available way for dealing with competing bandwidth requirements has been to buffer as much content as possible. Such use of a buffer may be inefficient, however, as it may place a high load on the computer serving the content and further fails to address the different bandwidth consumption among multiple devices in the network. Moreover, such a method requires a large buffer memory.

Another presently available way to manage bandwidth has been to prioritize certain applications over others. Such prioritizations are usually based on preferences and guesswork as to which devices should be allotted more bandwidth, while bandwidth to other devices may be throttled. Such methods are similarly inefficient, as such guesswork may still unfairly leave some devices starving for bandwidth, while other devices are provided with ample bandwidth even when they do not necessarily need it.

Yet another available way to manage bandwidth is to drop to a lower quality version (e.g., of a movie stream). Such an option may be displeasing to users, as well as content providers whose businesses rely on satisfying their users.

There is therefore a need for improved systems and methods for bandwidth management based on profiles.

SUMMARY OF THE INVENTION

Embodiments of the present invention include systems and methods for bandwidth management based on profiles. A requesting user using a user device may submit a request concerning access to an application or media file hosted or provided by a content provider. A profile associated with the requested application or media file may be accessed. Such a profile provides information regarding consumption of bandwidth throughout a time period of usage associated with the requested application or media file. Bandwidth requirements associated with the request may be determined based on the profile information, and bandwidth consumption by the user device may be managed based on the bandwidth requirements determined for the requested application or media file and available network bandwidth.

Various embodiments of the present invention include methods for bandwidth management based on profiles. Such methods may include receiving a request submitted by a requesting user using a user device concerning access to an application or media file, accessing a profile associated with the requested application or media file that provides information regarding consumption of bandwidth throughout a time period of usage, determining bandwidth requirements associated with the requested application or media file based on the profile information, and manages bandwidth consumption of the user device based on the bandwidth requirements determined for the requested application or media file and available network bandwidth.

Embodiments of the present invention may further include systems for bandwidth management based on profiles. Such systems may include a content provider for providing access to applications or media files and for storing one or more profiles in memory. Each profile is associated with one of the applications or media files and provides information regarding consumption of bandwidth throughout a time period of usage associated with the application or media file. Exemplary systems may further include a user device for using applications and media file. Such a user device may receive a request submitted by a requesting user, the request concerning access to an application or media file, access a profile associated with the requested application or media file that provides information regarding consumption of bandwidth throughout a time period of usage associated with the requested application or media file, determines whether and when bandwidth requirements associated with the requested application or media file exceed available network bandwidth based on the profile information, and manages bandwidth consumption of the user device during the time period of usage based on the determination regarding bandwidth requirements associated with the requested application or media file.

Other embodiments of the present invention include non-transitory computer-readable storage media on which is embodied instructions executable to manage bandwidth based on profiles in general accordance with the method previously set forth above.

DETAILED DESCRIPTION

Embodiments of the present invention allow for bandwidth management based on profiles. A requesting user using a user device may submit a request concerning access to an application or media file hosted or provided by a content provider. A profile associated with the requested application or media file may be accessed. Such a profile provides information regarding consumption of bandwidth throughout a time period of usage associated with the requested application or media file. Bandwidth requirements associated with the request may be determined based on the profile information, and bandwidth consumption by the user device may be managed based on the bandwidth requirements determined for the requested application or media file and available network bandwidth of membership in the group, access to the redeemable content may be denied.

Figure 1:
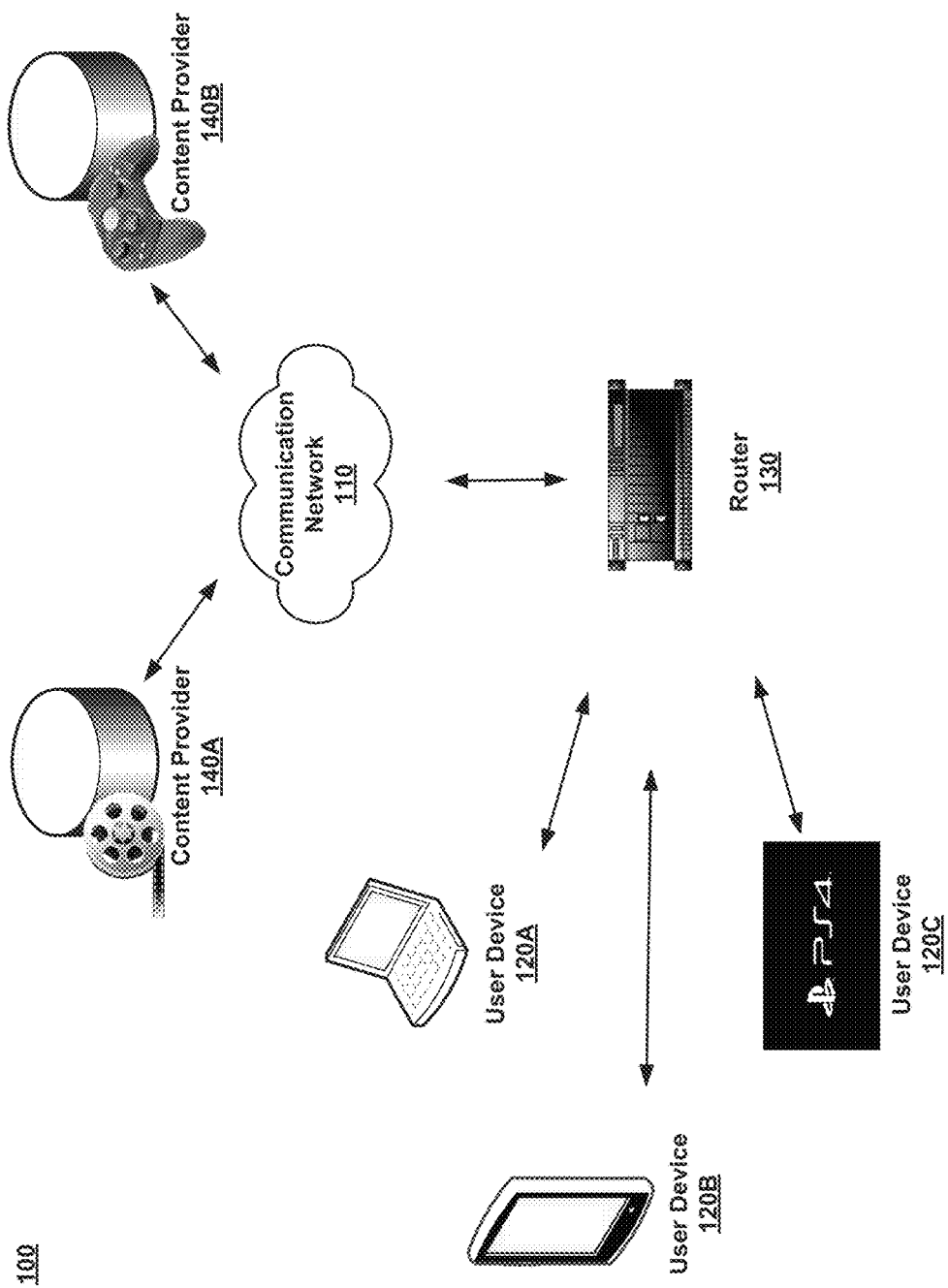
FIG. 1 illustrates a network environment in which a system for bandwidth management based on profiles may be implemented.

FIG. 1 illustrates an exemplary environment 100 in which a system for bandwidth management based on profiles may be implemented. In network environment 100, one or more user devices 120 may be in a network associated with a router 130, which is connected to a communication network 110. Environment 100 may additionally include one or more content providers 140A-B. While the present invention refers to content providers, such content providers may further encompass various service providers that provide user devices 120A-C with access to various applications, including games.

Communication network 110 may be part of the Internet, which is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 may allow for communication between the various components of environment 100.

Users may use any number of different electronic user devices 120, such as mobile phones, smartphones, personal digital assistants (PDAs), portable computing devices (e.g., laptop, netbook, tablets), desktop computing devices, game console, handheld gaming device, or any other type of computing device capable of communicating over communication network 110. User device 120 may be further associated with or accessory to a general-purpose computer, a set-top box, a Blu-Ray® player, an electronic gaming system, or a home entertainment device (e.g., Sony PlayStation®3 or Playstation®4), as well as any one of a number of portable media devices (e.g., Sony PlayStation® Portable (PSP®)). Each user device 120 may also be configured to access data from other storage media, such as memory cards or disk drives as may be appropriate in the case of downloaded content. User device 120 may include standard computing components such as network and media interfaces, non-transitory computer-readable storage (memory), and processors for executing instructions that may be stored in memory.

Figure 2A:
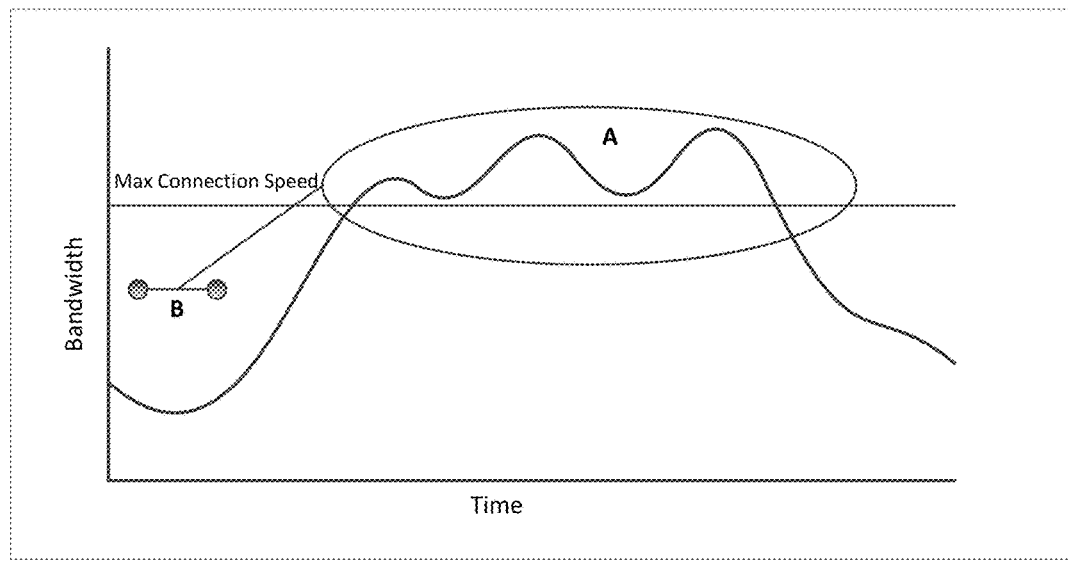
FIG. 2A illustrates an exemplary profile of an application or media file illustrating bandwidth consumption over time.
Figure 2B:
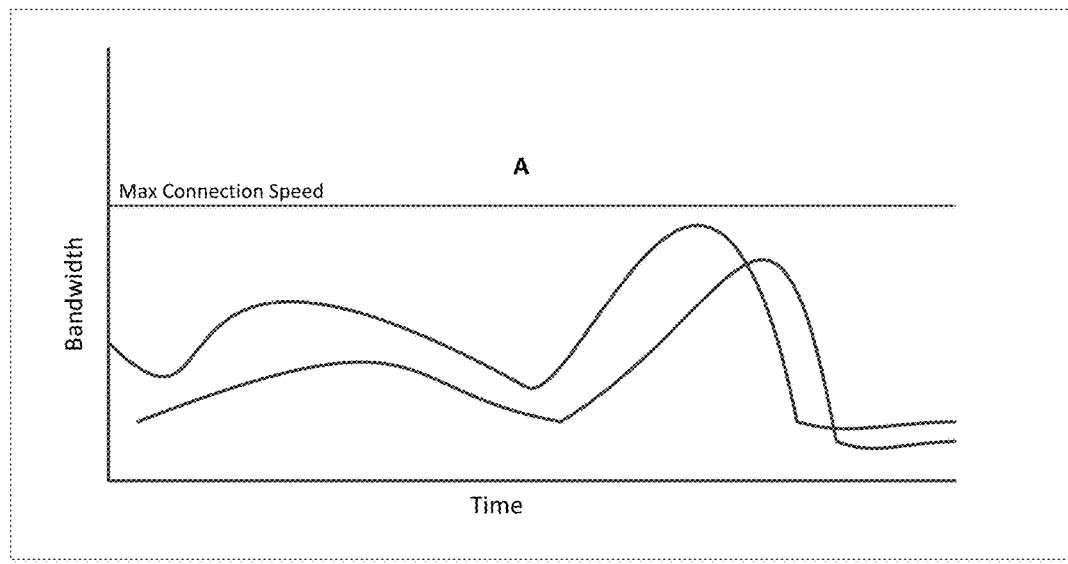
FIG. 2B illustrates two profiles illustrating bandwidth consumption over time.

In an exemplary embodiment, user device 120A may request that a movie be streamed from an online content provider (e.g., content provider 140A). In addition to providing access to the movie, the content provider 140A may provide user device 120A with a profile associated with the requested movie. An exemplary profile is illustrated in FIG. 2A, in which bandwidth usage by an application or media file is tracked over the period of use, play, or execution. For example, the requested movie may have a three-hour playtime. Throughout the course of those three hours, bandwidth usage may fluctuate. As can be seen in FIG. 2A, bandwidth usage starts out relatively low during period B (e.g., hour 1), but as usage continues, the bandwidth usage spikes during period A (e.g., hour 2) before subsiding for the rest of the movie. For the particular network to which the movie is being streamed, the bandwidth requirements of the movie exceeds the available network bandwidth (e.g., maximum connection speed) during period A. While maximum connection speed may vary from network to network, the profile can be used by user device 120A to determine whether and when bandwidth requirements of a particular application or media file exceeds available network bandwidth.

Because user device 120A is able to use the profile to predict that bandwidth requirements will spike during period A, user device 120B can use available bandwidth during period B to build a buffer in anticipation. Moreover, the size of the buffer may also be based on the extent to which the bandwidth during period A exceeds the maximum connection speed. As such, when the movie reaches period A, no skipping or freezing would occur. Further, bandwidth requirements during the three hour stream would be stabilized, as well as reducing buffering requirements and load on the server.

In a typical buffering scheme lacking such profile information, the movie stream may play normally during period B, but upon reaching period A, the stream may no longer be downloaded fast enough. As such, the movie may freeze or skip. Moreover, because such a buffering scheme is unaware of the pattern of fluctuation, unnecessary buffering may occur during period B or after period A. Such unnecessary buffering is an inefficient use of buffer memory.

Embodiments of the claimed invention may also take multiple user devices 120A-C into account. FIGURE B, for example, illustrates two profiles of applications and/or media files being used within a network. Although neither stream individually exceeds the connection speed, the combination of the two streams results in a spike in total bandwidth requirements, which would exceed the connection speed during period A. As such, the ability to predict such spikes (e.g., including spikes involving multiple streams) and the timing of such spikes allows for the ability to pre-fetch and buffer accordingly. Moreover, the pre-fetching and buffering may also occur more efficiently in a manner tailored to the particular bandwidth requirements of the applications and/or media files being played.

In such instances, the user devices 120A-C may exchange profile information and collaborate in coordinating such management of bandwidth among the user devices 120A-C. Such exchanges and communications regarding collaboration may occur via standard messages through the network. Alternatively, the coordination may be provided by a router, such as router 130. Router 130 may be any kind of router known in the art for forwarding data packets between computer networks. In some embodiments of the claimed invention, router 130 may perform certain coordination functions among the user devices 120A-C in the network. For example, the router 130 may gather profile information from all the user devices 120A-C that are using bandwidth-consuming applications and/or media files. Based on such profile information, router 130 may allocate bandwidth and communicate instructions to user devices 120A-C regarding how/when to use bandwidth. Where a router 130 allocates bandwidth, router 130 may incorporate various prioritization schemes for instances of extremely heavy use. While some current routers may have some prioritization capabilities, the lack of profile information means that such prioritization does not occur as efficiently. The use of profiles allows router 130 to instruct user devices 120A-C as to how and when to use bandwidth so as to provide the best quality service to the most user devices 120A-C over time.

Content providers 140A-B may host and provide user devices 120A-C with access to various applications and media files. In some embodiments, the content providers 140A-B may also store profiles associated with each application or media file. Content providers 140A-B may include any number of servers for performing its functions. Such servers may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content providers 140A-B may generate and store the profiles for the applications and/or media files that they host. A typical profile may include such information as estimate of average bandwidth required, peak bandwidth required, a minute-by-minute (or other time chunks) account of bandwidth required over time, minimum/maximum latency requirements, type of application/media file, whether bandwidth requirements are steady or tends to spike (and to what degree), and how long an application can go without network access without failing, and other related information. For media files, for example, a profile may provide information regarding bandwidth usage and requirements (e.g., average bit rate) for each minute of play. In contrast, certain applications, such as games, may be slightly more variable in terms of bandwidth usage and requirements. There may, however, still be predictable sequences of fluctuations that can be reflected in a profile. For example, a game may have predictable periods of latency and bandwidth. Such a profile may be updated in real-time based on certain events occurring within a game, which trigger such predictable periods. Such a real-time update may indicate that the application needs, e.g., 2 mbps of bandwidth for the next 20 minutes or 100 ms latency but only 0.5 mbps bandwidth.

Figure 3:
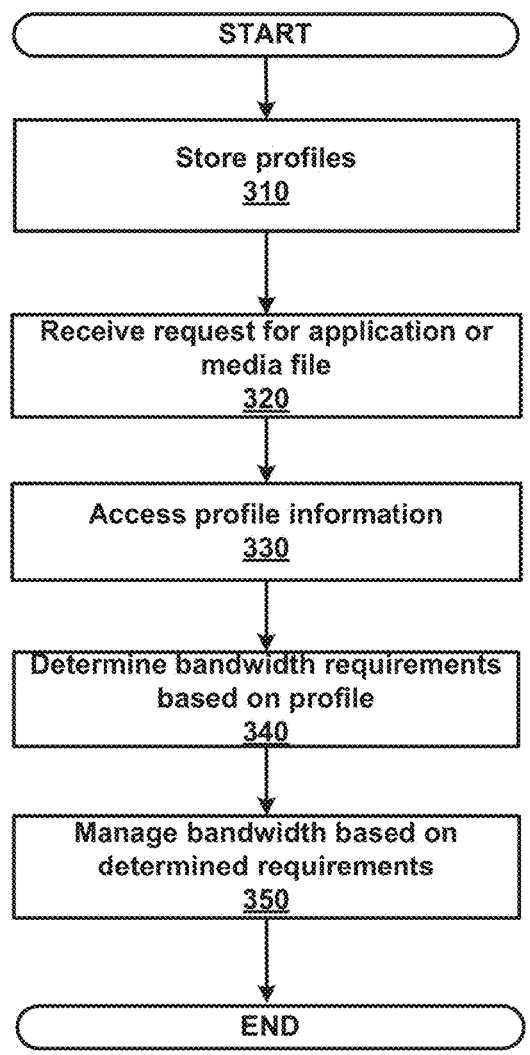
FIG. 3 is a flowchart illustrating a method for bandwidth management based on profiles.

FIG. 3 is a flowchart illustrating an exemplary method 300 for bandwidth management based on profiles. The method 300 of FIG. 3 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 as illustrated in FIG. 3, profile information is stored regarding an application or media file, a request for an application or media file submitted by a user is received, profile information regarding the requested application or media file is accessed and used to determine bandwidth that will be required over the course of the time period of using the application or media file, and bandwidth is managed over the time period in accordance with the determined requirements.

In step 310, profile information may be maintained by content providers 140A-C. Content providers 140A-C may encompass one or multiple databases for storing such profile information for various applications and/or media files. Such information may be provided in whole or in part by makers or developers of the applications and/or media files or analyzed and determined by the content providers 140A-C.

In step 320, a user request for an application or media file is sent from user device 120A to content provider 140A. In turn, the content provider 140A may provide (e.g., stream) the requested application or media file to the user device 120A. The provided application or media file may be sent in conjunction with an associated profile that provides information as to how much bandwidth is used by the application or media file and associated timing regarding bandwidth fluctuations. Where the request concerns a movie, for example, an associated profile—which may be similar to that illustrated in FIG. 2A—may be sent to the requesting user device 120A.

In step 330, the user device 120A may access such profile information sent along with the streamed movie, and in step 340, determine bandwidth requirements based on the profile. Referring the profile illustrated in FIG. 2A, such a determination may involve identifying that a spike in bandwidth requirement will occur during the second hour (e.g., period A) of the movie. Further, it may be determined that the spike in bandwidth requirements exceeds available bandwidth in the network.

In embodiments where there are multiple user devices 120A-C in the network streaming movies or playing games, multiple profiles may be accessed (e.g., exchanged or shared via standard messages) and used to determine total bandwidth requirements and evaluate the same in light of the available bandwidth. Such steps may be performed by the user devices 120A-C or by a router 130.

In step 350, the user device 120A may take steps to address the predicted spike. Such steps may include building a buffer before the spike occurs (e.g., during period B) so that when period A is reached, the movie may continue to be played smoothly without any skips or freezing. The size of the buffer built during period B may also be based on the extent to which the predicted spike exceeds available bandwidth.

Where collaboration between multiple user devices 120A-C or central coordination by a router 130 is involved, such steps to manage bandwidth may involve providing notifications or instructions as to when and to what extent to buffer or otherwise prepare for a spike at certain points during the time period of usage.

The present invention may be implemented in an application that may be operable using a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for bandwidth management based on profiles, the method comprising:
receiving a request submitted at a user interface of a user device, the request concerning streaming digital content hosted at a remote content server;
receiving a stream of the requested digital content and a resource profile associated with the requested digital content over a communication network from the remote content server, wherein the resource profile is stored at the remote content server and is transmitted to the user device as the requested digital content begins streaming; and
executing instructions stored in memory, wherein execution of the instructions by a processor:
evaluates the resource profile as the requested digital content is being streamed to the user device, wherein the resource profile includes a predetermined pattern of bandwidth consumption throughout a predetermined playtime associated with a complete stream of the requested digital content,
makes a prediction regarding one or more fluctuations in bandwidth requirements associated with completing the stream of the requested digital content to the user device throughout the predetermined playtime, wherein the predetermined pattern indicates at least one span within the predetermined playtime during which span the bandwidth required for streaming the requested digital content to the user device is predicted to exceed available network bandwidth,
manages bandwidth consumption by the user device as the stream continues throughout the predetermined playtime based on the predicted bandwidth requirements, wherein a buffer is built up at the user device prior to the identified span based on the prediction,
identifies that there is at least one other user device streaming digital content in a same local network as the user device, wherein the digital content streamed by the at least one other user device is associated with a corresponding predetermined pattern of bandwidth consumption, and
adjusts the size of the buffer built at the user device based on a combined total of predicted bandwidth requirements for the user device and the at least one other user device.

2. The method of claim 1, wherein the resource profile provides an average bit rate for each of a plurality of predetermined chunks of time within the predetermined playtime associated with the complete stream of the requested digital content.

3. The method of claim 1, further comprising storing a plurality of resource profiles in memory, and wherein each resource profile is associated with one of a plurality of different digital content titles.

4. The method of claim 3, wherein managing bandwidth is further based on bandwidth requirements of one or more other digital content titles being streamed in a local network of the user device, each other digital content title associated with a respective different resource profile indicating a respective predetermined pattern of bandwidth consumption associated with the other digital content title throughout a respective predetermined playtime to complete the respective stream.

5. The method of claim 4, wherein the local network includes one or more other user devices each streaming a respective digital content title, and further comprising:
providing the resource profile to a router of the local network, wherein each of the other user devices also provides a respective resource profile regarding the respective digital content title to the router; and
receiving instructions from the router regarding coordination of bandwidth consumption, wherein the router also sends instructions to the other user devices regarding the coordination of bandwidth consumption.

6. The method of claim 5, wherein the coordination of bandwidth consumption by the router includes allocating bandwidth to each user device in the local network based on a prioritization scheme, wherein each priority is based on a resource profile of a respective resource consumed by each user device in the local network.

7. The method of claim 4, wherein the local network includes one or more other user devices in the network each streaming a respective digital content title, and further comprising:
providing information regarding the determined bandwidth requirements to the other user devices;
receiving information regarding bandwidth requirements from each of the other user devices; and
collaborating with each of the other user devices to manage bandwidth consumption.

8. The method of claim 4, wherein managing bandwidth consumption is based on a cumulative total bandwidth requirements for streaming the plurality of digital content titles to the user device in comparison to the available network bandwidth.

9. The method of claim 1, wherein the size of the buffer built at the user device is based on how much the required bandwidth is predicted to exceed the available network bandwidth during the identified span.

10. The method of claim 1, wherein the requested digital content is a game, and wherein the resource profile is updated in real-time based on a trigger detected in the game during play at the user device.

11. A system for bandwidth management based on profiles, the system comprising:
a remote content server that hosts digital content and a resource profile associated with the digital content, wherein resource profile includes a predetermined pattern of bandwidth consumption throughout a predetermined playtime associated with a complete stream of the digital content; and a user device that:

receives a request submitted at a user interface, the request concerning access to the digital content hosted by the content server, transmits the request to the remote content server over a communication network, receives a stream of the digital content and the resource profile associated with the requested digital content over the communication network from the remote content server, wherein the resource profile is transmitted to the user device as the requested digital content begins streaming, and executes instructions stored in memory, wherein execution of the instructions by a processor:

evaluates the resource profile as the requested digital content is being streamed to the user device, makes a prediction regarding one or more fluctuations in bandwidth requirements associated with completing the stream of the requested digital content to the user device throughout the predetermined playtime, wherein the predetermined pattern indicates at least one span within the predetermined playtime during which span the bandwidth required for streaming the digital content to the user device is predicted to exceed available network bandwidth, manages bandwidth consumption by the user device throughout the predetermined playtime based on the predicted bandwidth requirements, wherein a buffer is built up at the user device prior to the identified span based on the prediction, identifies that there is at least one other user device streaming digital content in a same local network as the user device, wherein the digital content streamed by the at least one other user device is associated with a corresponding predetermined pattern of bandwidth consumption, and adjusts the size of the buffer built at the user device based on a combined total of predicted bandwidth requirements for the user device and the at least one other user device.

12. The system of claim 11, wherein the resource profile provides an average bit rate for each of a plurality of predetermined chunks of time within the predetermined playtime associated with the complete stream of the requested digital content.

13. The system of claim 11, wherein a plurality of other digital content titles is being streamed in a local network of the user device, each other digital content title is associated with a respective resource profile indicating a predetermined pattern of bandwidth consumption associated with the other digital content title throughout a respective predetermined playtime to complete the respective stream.

14. The system of claim 13, wherein the local network further comprises a router, wherein the router:

receives the resource profile from the user device and at least one other resource profile from at least one other user device in the local network that is consuming one of the other digital content titles; and provides instructions to the user device and the at least one other user device regarding coordination of bandwidth consumption.

15. The system of claim 11, wherein the size of the buffer built at the user device is based on how much the required bandwidth is predicted to exceed the available network bandwidth during the identified span.

16. The system of claim 11, further comprising one or more other user devices in the local network each streaming a respective digital content title, wherein the user device exchanges the resource profile with a respective resource profile from each of the other user devices, and wherein the user device and each of the other user devices collaborate to manage bandwidth consumption.

17. The system of claim 11, wherein the requested digital content is a game, and wherein the resource profile is updated in real-time based on a trigger detected in the game during play at the user device.

18. A non-transitory computer-readable storage medium, having embodied thereon a program executable by a processor to perform a method for bandwidth management based on profiles, the method comprising:

receiving a request submitted at a user interface of a user device, the request concerning streaming digital content hosted at a remote content server;

receiving a stream of the requested digital content and a resource profile associated with the requested digital content over a communication network from the remote content server, wherein the resource profile is stored at the remote content server and is transmitted to the user device as the requested digital content begins streaming;

evaluating the resource profile as the requested digital content is being streamed to the user device, wherein the resource profile includes a predetermined pattern of bandwidth consumption throughout a predetermined playtime associated with a complete stream of the requested digital content;

making a prediction regarding one or more fluctuations in bandwidth requirements associated with completing the stream of the requested digital content to the user device throughout the predetermined playtime, wherein the predetermined pattern indicates at least one span within the predetermined playtime during which span the bandwidth required for streaming the requested digital content to the user device is predicted to exceed available network bandwidth;

managing bandwidth consumption by the user device as the stream continues throughout the predetermined playtime based on the identified predicted bandwidth requirements, wherein a buffer is built up at the user device prior to the identified span based on the prediction;

identifying that there is at least one other user device streaming digital content in a same local network as the user device, wherein the digital content streamed by the at least one other user device is associated with a corresponding predetermined pattern of bandwidth consumption; and adjusting the size of the buffer built at the user device based on a combined total of predicted bandwidth requirements for the user device and the at least one other user device.

19. An apparatus for bandwidth management based on profiles, the apparatus comprising:

a network interface that receives a plurality of resource profiles associated with digital content titles being streamed to one or more user devices in a local network, each resource profile including a respective predetermined pattern of bandwidth consumption throughout a predetermined playtime associated with a complete stream of the respective associated digital content title that is being streamed to the one or more user devices; and a processor that executes instructions stored in memory, wherein execution of the instructions by the processor:

makes a prediction regarding one or more fluctuations in bandwidth requirements associated with streaming the digital content titles within the local network based on the plurality of resource profiles, wherein the predetermined patterns indicate at least one span within the predetermined playtimes during which span the bandwidth required for streaming the digital content titles within the local network is expected to exceed available network bandwidth, and allocates a bandwidth to each of the user devices in the local network ahead of the identified span based on how much the required bandwidth is predicted to exceed the available network bandwidth;

wherein the network interface transmits instructions to each of the user devices regarding a respective allocated bandwidth, wherein each of the user devices builds a buffer prior to the span in accordance with the allocated bandwidth.

20. A method for bandwidth management based on profiles, the method comprising:

receiving a plurality of resource profiles associated with digital content titles being streamed to one or more user devices in a local network, each resource profile including a respective predetermined pattern of bandwidth consumption throughout a predetermined playtime associated with a complete stream of the respective associated digital content title that is being streamed to the one or more user devices;

making a prediction regarding one or more fluctuations in bandwidth requirements associated with streaming the digital content titles within the local network based on the plurality of resource profiles, wherein the predetermined patterns indicate at least one span within the predetermined playtimes during which span the bandwidth required for streaming the digital content titles within the local network is expected to exceed available network bandwidth;

allocating a bandwidth to each of the user devices in the local network ahead of the identified span based on how much the required bandwidth is predicted to exceed the available network bandwidth; and transmitting instructions to each of the user devices regarding a respective allocated bandwidth, wherein each of the user devices builds a buffer prior to the span in accordance with the allocated bandwidth.

* * * * *